United States Patent
Walsh

(10) Patent No.: US 10,059,574 B2
(45) Date of Patent: Aug. 28, 2018

(54) SYSTEMS AND METHODS FOR LIFTING AND TRANSPORTING A SHELVING SYSTEM

(71) Applicant: Gondola Train, Potosi, WI (US)

(72) Inventor: Richard Walsh, Galena, IL (US)

(73) Assignee: Gondola Train, Potosi, WI (US)

( * ) Notice: Subject to any disclaimer, the term of this patent is extended or adjusted under 35 U.S.C. 154(b) by 0 days.

(21) Appl. No.: 15/440,016

(22) Filed: Feb. 23, 2017

(65) Prior Publication Data

US 2017/0334692 A1   Nov. 23, 2017

Related U.S. Application Data

(60) Provisional application No. 62/339,023, filed on May 19, 2016.

(51) Int. Cl.
*B62B 3/10* (2006.01)
*B66F 3/08* (2006.01)
*B60P 3/00* (2006.01)

(52) U.S. Cl.
CPC ............... *B66F 3/08* (2013.01); *B60P 3/00* (2013.01); *B62B 3/10* (2013.01)

(58) Field of Classification Search
CPC ..... B60P 3/00; B60P 1/02; B62B 3/10; B62B 3/00; B62B 3/002; B62B 3/005
USPC ............................................... 414/458, 495
See application file for complete search history.

(56) References Cited

U.S. PATENT DOCUMENTS

| | | |
|---|---|---|
| 80,600 A | 8/1868 | Clark |
| 1,501,280 A | 7/1924 | Hinshaw |
| 1,527,419 A | 2/1925 | Leonard, Jr. |
| 2,296,610 A | 9/1942 | Grassick |
| 2,521,819 A | 9/1950 | Baer |
| 2,536,550 A | 1/1951 | Hughes |
| 2,568,827 A | 9/1951 | Schallock |
| 2,743,833 A | 5/1956 | Peterson |
| 2,980,271 A | 4/1961 | Ulinski |
| 3,145,863 A | 8/1964 | Dunaski |

(Continued)

FOREIGN PATENT DOCUMENTS

FR  457741  9/1913

OTHER PUBLICATIONS

Gondola Skate; Product Sheet for "Rhino II HD Multi-Purpose Skate"; Mar. 2017 (1 page).

(Continued)

*Primary Examiner* — James R Bidwell
(74) *Attorney, Agent, or Firm* — Nixon Peabody LLP

(57) ABSTRACT

Presented herein is a system and method for moving a shelving system includes a plurality of contact members, a plurality of lifting mechanisms, and a plurality of cross members. A single lifting mechanism is coupled with each end of each of the plurality of contact members. The coupling between a lifting mechanisms and an end of a contact member is secured with a locking mechanism. Each cross member is coupled with two adjacent contact members or the lifting mechanisms therewith. The lifting mechanisms may be activated to raise or lowered the contact members coupled therewith, for example by rotating a hand crank. As the contact members are raised, they engage the feet of the shelving system and raise the shelving system off of the floor. The shelving system may then be moved to a desired location.

18 Claims, 12 Drawing Sheets

(56) References Cited

U.S. PATENT DOCUMENTS

| | | | |
|---|---|---|---|
| 3,208,768 A | 9/1965 | Hulbert |
| 3,370,725 A | 2/1968 | Jones |
| 3,633,774 A | 1/1972 | Lee |
| 3,786,947 A | 1/1974 | Craft, III |
| 3,809,261 A | 5/1974 | Lee |
| 3,861,662 A | 1/1975 | Morse |
| 3,923,354 A | 12/1975 | Young |
| 3,931,986 A | 1/1976 | Hunziker |
| 4,084,125 A | 4/1978 | King |
| 4,127,202 A | 11/1978 | Jennings |
| 4,138,173 A | 2/1979 | Taniwaki |
| 4,213,624 A | 7/1980 | Sanders |
| 4,312,609 A | 1/1982 | Culley, Jr. |
| 4,462,569 A | 7/1984 | Arzouman |
| 4,607,823 A | 8/1986 | Thomas |
| 4,624,468 A | 11/1986 | Onken |
| 4,699,391 A * | 10/1987 | Syring | B62B 5/0083 280/79.11 |
| 4,746,141 A | 5/1988 | Willis |
| 4,824,313 A | 4/1989 | Miller |
| 4,887,836 A | 12/1989 | Simjian |
| 4,921,264 A | 5/1990 | Duffy |
| 4,934,893 A | 6/1990 | Johnson |
| 5,018,930 A | 5/1991 | Hardin |
| 5,372,353 A | 12/1994 | West |
| 5,536,131 A | 7/1996 | Behr |
| 5,681,139 A | 10/1997 | Szanto |
| 5,688,102 A | 11/1997 | Vieselmeyer |
| 5,716,186 A | 2/1998 | Jensen |
| 5,782,600 A | 7/1998 | Walsh |
| 5,822,829 A | 10/1998 | Webb |
| 6,082,956 A | 7/2000 | Pentland |
| 6,089,545 A | 7/2000 | Norman |
| 6,146,081 A | 11/2000 | Anderson |
| 6,206,628 B1 | 3/2001 | McDermott |
| 6,338,470 B1 | 1/2002 | Steely |
| 6,354,570 B1 | 3/2002 | Christensen |
| 6,427,979 B1 | 8/2002 | Vogt |
| 6,431,805 B2 | 8/2002 | Lanciaux, Jr. |
| D468,512 S | 1/2003 | Hernandez |
| 6,561,487 B2 | 5/2003 | Siglock |
| 6,752,379 B1 | 6/2004 | Wall |
| 6,923,466 B2 | 8/2005 | Tsai |
| 6,971,696 B1 | 12/2005 | Koester |
| 7,137,615 B2 | 11/2006 | Ray, Jr. |
| 7,208,667 B2 | 4/2007 | Morgan |
| 7,311,487 B1 | 12/2007 | Crossley |
| 7,328,907 B1 | 2/2008 | Bileth |
| 7,434,783 B2 | 10/2008 | Arzouman |
| 7,438,301 B2 | 10/2008 | Schilling |
| 7,823,861 B2 | 11/2010 | Krug |
| 8,128,334 B2 | 3/2012 | Arensdorf |
| 8,317,451 B2 | 11/2012 | Cozza |
| 8,596,613 B2 | 12/2013 | Arensdorf |
| 8,794,899 B2 | 8/2014 | Cozza |
| 8,845,263 B2 | 9/2014 | Walsh |
| 8,967,592 B2 | 3/2015 | Cozza |
| 9,045,153 B2 | 6/2015 | Cozza |
| 2001/0008344 A1 * | 7/2001 | Lanciaux, Jr. | B65D 90/146 414/458 |
| 2002/0025246 A1 | 2/2002 | Lindgren |
| 2002/0056692 A1 | 5/2002 | Merkel |
| 2003/0215314 A1 | 11/2003 | Klokke |
| 2004/0083025 A1 | 4/2004 | Yamanouchi |
| 2004/0208736 A1 | 10/2004 | Mensch |
| 2005/0116432 A1 | 6/2005 | Borrmann |
| 2006/0119059 A1 | 6/2006 | O'Connor |
| 2008/0232944 A1 | 9/2008 | Kim |
| 2010/0196128 A1 * | 8/2010 | Arensdorf | B62B 3/02 414/458 |
| 2010/0237577 A1 | 9/2010 | Bolster |
| 2012/0256060 A1 | 10/2012 | West |
| 2013/0154216 A1 | 6/2013 | Paulk, Sr. |
| 2014/0369795 A1 | 12/2014 | Walsh |

OTHER PUBLICATIONS

Johns Installations; Video for "Peggs Gondola Mover"; retrieved from https://www.youtube.com/watch?v=J74msJhPxcQ; uploaded Sep. 11, 2009.

International Search Report and Written Opinion of International Searching Authority for Application No. PCT/US2017/033261, dated Aug. 4, 2017 (8 pages).

* cited by examiner

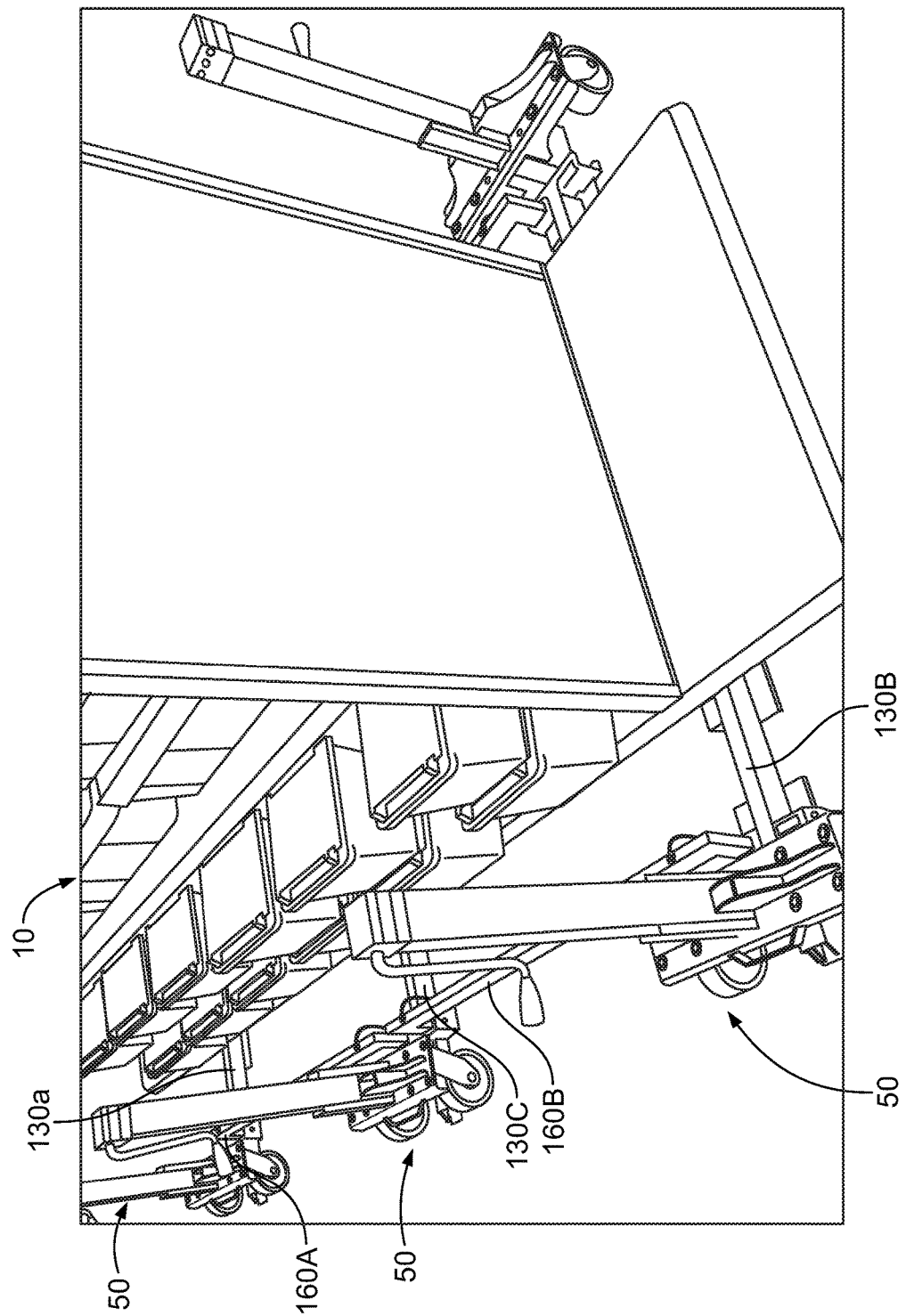

SYSTEMS AND METHODS FOR LIFTING AND TRANSPORTING A SHELVING SYSTEM

CROSS-REFERENCES TO RELATED APPLICATIONS

This application claims priority to U.S. provisional application Ser. No. 62/339,023, filed May 19, 2016, entitled "Systems and Methods for Lifting and Transporting a Shelving System, which is hereby incorporated by reference herein in its entirety.

TECHNICAL FIELD

The present disclosure relates generally to systems and methods for moving shelving systems and, more particularly, to a system and method for lifting up one or more shelf units for easy and stable transport.

BACKGROUND

Stores, such as hardware stores, grocery stores, or retail stores, often display goods on shelving systems, which may include a plurality of shelving units. These shelving units are generally arranged throughout the store in a coherent manner that allows a customer easy access to displayed goods. On certain occasions, it may become necessary for the store to rearrange their shelving units. For example, the store may want to redesign the layout of their products in an attempt improve customer experience. Or, the store may be undergoing renovation, such as the installation of new flooring, which would necessitate moving the shelving units.

In a conventional technique, all of the products stored in a shelving unit are removed prior to moving the shelving unit. The shelving unit is then dismantled or disassembled, and the individual pieces or components are transferred to a desired location. There, the shelving unit is reassembled, and all of the products are then placed back onto the shelving unit. It is generally necessary to remove all products before moving the shelving unit because a shelving unit that is fully stocked with products can weigh several hundred pounds. This method is time-consuming and labor intensive. A store may require several days or weeks to rearrange all of its shelving units using this method.

Other techniques for moving shelving units includes systems with mechanical devices that are capable of lifting and moving a stocked shelving unit. Many of these conventional systems employ complex designs with multiple components. Often, these components are required to be bolted or pinned to one another and/or to the shelving unit itself. These systems are often difficult and/or time consuming to operate. Furthermore, these systems often require one or more people to position themselves underneath the shelving unit itself to physically assemble the different components, which may be dangerous.

SUMMARY

Embodiments according to aspects of the present invention provide a system and method for moving shelf units that overcomes the shortcomings associated with conventional techniques described previously. The embodiments provide an efficient and convenient system and method for lifting up one or more shelf units and transporting those shelf units safely and efficiently. In an example application, the embodiments may be employed to move a gondola shelving system, which is a known type of display shelving typically used in a retail store setting.

In a first embodiment, a system for transporting a shelving system includes a plurality of contact members, a plurality of lifting mechanisms, and a plurality of cross members. Each end of each of the plurality of cross members is coupled with a respective one of the plurality of lifting mechanisms. Each lifting mechanism is coupled with a respective one of the plurality of contact members. Each of the plurality of cross members is configured to be coupled with a first contact member or the lifting mechanism coupled therewith, and a second contact member or the lifting mechanism coupled therewith. These two contact members are adjacent to each other. When all components have been coupled, each contact member is connected to all adjacent contact members by a single respective cross member.

In a second embodiment, a system for transporting a shelving system includes two outer contact members, an inner contact member, a plurality of lifting mechanisms, and a plurality of cross members. Each end of each contact member is coupled with a respective lifting mechanism. Each end of the inner contact member is coupled with two of the plurality of cross members, while each end of each outer contact member is coupled with a single cross member. The cross members coupled with the same end of the outer contact members are separate and distinct cross members. Each lifting mechanism is coupled with a single contact member.

In a third embodiment, a system for transporting a shelving system includes a first contact member, a second contact member, a plurality of lifting mechanisms, a first cross member, a second cross member, a first assistance mechanism and a second assistance mechanism. A single lifting mechanism is coupled with each end of the first and second contact members. The first cross member is coupled with the first end of both the first contact member and the second contact member, or with a first lifting mechanism and a second lifting mechanism. The second cross member is coupled with the second end of both the first contact member and the second contact member, or with a third lifting mechanism and a fourth lifting mechanism. The first assistance mechanism is coupled with the first lifting mechanism and the second lifting mechanism. The second assistance mechanism is coupled with the third lifting mechanism and the fourth lifting mechanism.

In a method for transporting a shelving system, a plurality of contact members having first and second ends is provided. The contact members are slid underneath a first side of the shelving system through to a second side of the shelving system, such that each end of each contact member extends beyond a respective side of the shelving system. A lifting mechanism is coupled with each end of each of the contact members. A plurality of cross members are coupled with the plurality of contact members such that each contact member is connected to all adjacent contact members. The plurality of lifting mechanisms are activate to raise the shelving system off of the floor, and the shelving system is moved to a desired location.

These and other aspects of the present invention will become more apparent from the following detailed description of the system in conjunction with the accompanying drawings.

BRIEF DESCRIPTION OF THE DRAWINGS

FIG. 8 is a perspective view of an embodiment of the system according to the present disclosure being used to lift a shelving system.

Figure 1:
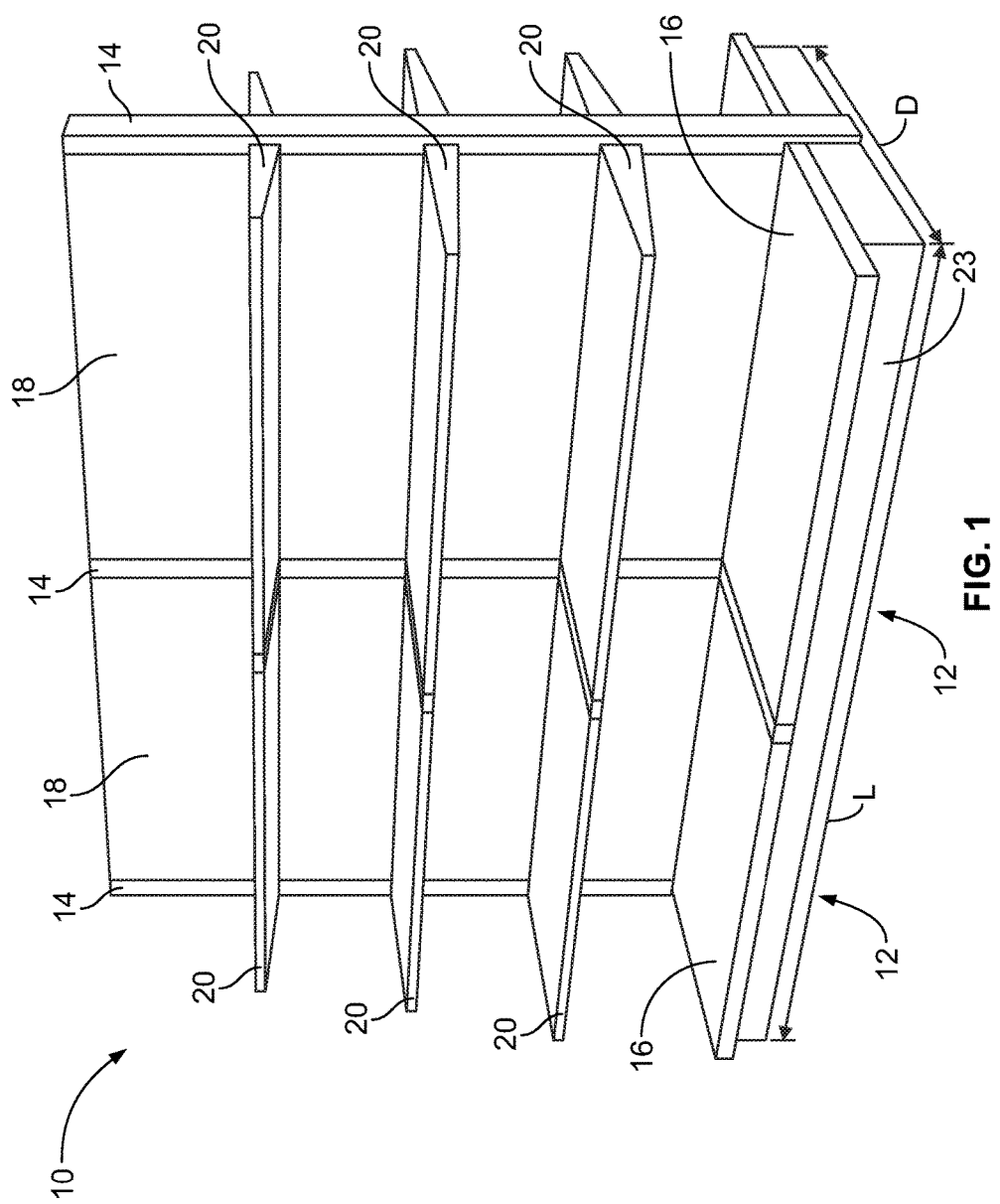
FIG. 1 illustrates an exemplary shelving system related to aspects of the present disclosure.

The present disclosure is susceptible to various modifications and alternative forms, and some representative embodiments have been shown by way of example in the drawings and will be described in detail herein. It should be understood, however, that the inventive aspects of the disclosure are not limited to the particular forms disclosed. Rather, the disclosure is to cover all modifications, equivalents, and alternatives falling within the spirit and scope of the invention as defined by the appended claims.

DETAILED DESCRIPTION

This disclosure is susceptible of embodiment in many different forms. There is shown in the drawings, and will herein be described in detail, representative embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

The devices, systems, and methods described herein may be utilized to lift and transport a shelving system, such as gondola-style shelving. The shelf-moving system allows the shelving system to be transported without removing any merchandise or other items stored thereon. The shelf-moving system generally includes a plurality of contact members that are placed underneath the shelving system. The number of contact members that are placed underneath the shelving system in order to move the shelving system generally depends on the length of the shelving system. Shorter shelving system may require as little as two contact members to move. However, other shelving systems may require a larger number of contact members. The contact members generally include a number of outwardly-extending projections that are spaced to engage the feet of the shelving system therebetween. A single contact member generally spans a distance that is greater than the depth D of the shelving system (see FIG. 8), with each end of the contact member extending beyond the sides of the shelving system. The system further includes a plurality of cross members that are coupled with the plurality of contact members, or a plurality of lifting mechanisms as described below. The cross members include angled end portions that are insertable into cavities located on the contact members or the lifting mechanisms. One angled end portion of a cross member is coupled with an end of a first contact member, while the other angled end portion is coupled with an end of a second contact member adjacent to the first contact member. A single contact member may be coupled with one or two cross members, depending on the contact member's location underneath the shelving system and/or the size of the shelving system. For example, the contact members at either end of the shelving system are only coupled with a single cross member, while all contact members located between the two outer contact members are coupled with two different cross members. In this manner, each contact member is connected to all adjacent contact members by one or two cross members.

The system also includes a plurality of lifting mechanisms. A single lifting mechanism may be coupled with an end of a single contact member and is used to raise or lower that end of the contact member, thus raising or lowering the shelving system. Each lifting mechanism generally includes a sleeve defined by a sleeve housing that the end of a contact member may be inserted into. A locking mechanism at the end of the contact member secures the coupling between the contact member and the lifting mechanism, thereby inhibiting or preventing the two components from inadvertently decoupling while the system is in use. Each end of each contact member is coupled with a single respective lifting mechanism. Similarly, each lifting mechanism is coupled with a single respective contact member.

Alternatively, the ends of the contact members may include the sleeve defined by the sleeve housing that a lifting mechanisms may be inserted into. A locking mechanism located on the lifting mechanism may then be used to secure the coupling between the lifting mechanism and the contact member. Again here, each end of each contact member is coupled with a single respective lifting mechanism, and each lifting mechanism is coupled with a single respective contact member.

The system may also include one or more assistance mechanisms. In one non-limiting embodiment, the assistance mechanism is a generally rectangular-shaped component that is configured to couple with adjacent lifting mechanisms. The assistance mechanism helps to secure the adjacent lifting mechanisms and to prevent the lifting mechanisms or the contact members from being forced out of alignment. The assistance mechanism may also include one or more brackets that are configured to receive a push bar therein. The push bar provides a handhold for a person operating the system to grasp and move the shelf once lifted.

In operation, the cross members may be coupled with the contact members prior to or subsequent to the lifting mechanisms being coupled with the contact members. In either scenario, once all the components of the system are coupled with each other, the shelving system may be lifted and transported. The lifting mechanisms include a component such as, but not limited to, a hand crank that is used to activate the lifting mechanisms, i.e., to raise and lower the contact members coupled therewith. As the hand crank is rotated, the lifting mechanisms raise the contact members off of the ground and into the air. As the contact members are raised, they engage the feet of the shelving system and thus lift the shelving system into the air. The lifting mechanisms may generally be activated in any order to raise the shelving system. For example, a user may activate all of the lifting mechanisms on a single side of the shelving system, then proceed to activate the lifting mechanism on the opposite side of the shelving system. In an advantageous arrangement, multiple people may be present, allowing multiple lifting mechanisms to be activated simultaneously.

When activating the lifting mechanisms to raise the contact members (and thus the shelving system), there is a certain amount of torque, or twisting force, imparted to the contact members. This twisting force can cause the contact members to rotate about a longitudinal axis running the length of the contact member from one end to the other end. Any rotation increases the risk that the feet of the shelving system will disengage from the contact members during operation, causing damage to the shelving system and/or the merchandise thereon. The plurality of cross members, each secured by a pin, assist in counteracting this twisting force. The cross members couple with adjacent contact members, thereby inhibiting or preventing the contact members from twisting and providing stability to the system. The assistance mechanisms provide a similar benefit to the system, as each assistance mechanism is similarly configured to secure adjacent lifting members.

Once all of the lifting mechanisms have been activated and thus all of the contact members have lifted the shelving system off of the ground, the shelving system may be transported to a desired location. The lifting mechanisms include one or more wheels to allow the shelving system to be pushed or pulled. Once the shelving system has been moved to a desired location, the process may be reversed. The lifting mechanisms lower the contact members and, accordingly, the feet of the shelving system, to the ground, for example, by rotating the hand crank in an opposite direction. The contact members disengage the feet of the shelving system, which will then be supporting its own weight.

Referring now to FIG. 1, an exemplary shelving system 10 is shown. The shelving system 10 shown is generally referred to as a gondola or a gondola system. Gondolas are a type of shelving system commonly used in retail settings. The shelving system generally has a length L and a depth D. As shown, the shelving system 10 generally consists of one or more individual sections 12, with the sections 12 being joined together at vertical posts 14. The individual sections 12 include a base 16 and backplate 18 mounted on the base 16. The base 16 acts as the lowermost shelf. Individual shelves 20 are attached to the backplate 18 at desired heights to allow products or other items to be displayed. The backplate 18 may be made of metal or any other suitable material. Shelves 20 are generally located on both sides of the shelving system 10 if the shelving system 10 located the middle of a store. However, the shelving system 10 may also be placed adjacent to a store wall, in which case the shelving system 10 would only have shelves 20 located on one side.

Figure 7:
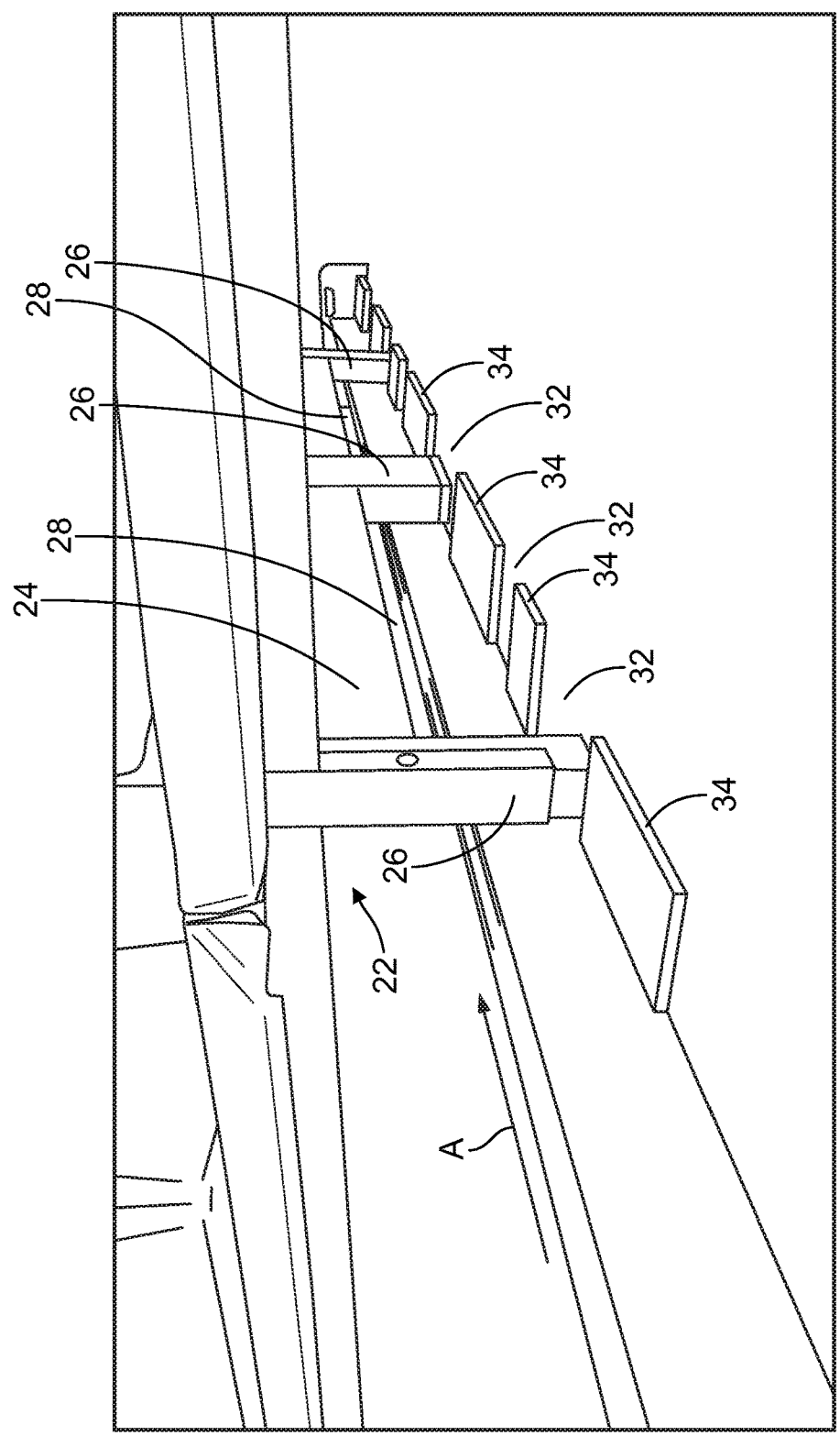
FIG. 7 is a side perspective view of the contact member of FIGS. 2A-2C being placed underneath an exemplary shelving system in accordance with aspects of the present disclosure.

The shelving system 10 rests on a plurality of feet 22 (as shown in FIG. 7). The feet 22 are located underneath the base 16 of the shelving system 10, generally at every junction between two sections 12 of the shelving system 10. A removable kickplate 23 may be located at the base 16 of the shelving system 10. The removable kickplate 23 may be in a closed configuration, so as to prevent unwanted objects from being placed underneath the shelving system. The removable kickplate 23 may also be in an open configured, so as to permit cleaning underneath the shelving system 10. In either configuration, the removable kickplate 23 restricts the movement of the vertical posts 14. As shown in FIG. 7, each foot 22 generally includes an upper portion 24 and a plurality of extensions 26 that are in contact with the ground. An aperture 28 is defined between individual extensions 26. The feet 22 may be integral with the vertical posts 14 shown in FIG. 1. In that case, the feet 22 are simply the lower portion of a single member whose upper portion runs vertically along the shelving system as shown by vertical post 14. Alternatively, the feet 22 may be a separate component from vertical post 14, where the feet 22 are attached to the vertical posts 14 in a suitable manner. While the shelving system 10 described here is a gondola-type shelving system, other types of shelving systems 10 may be lifted and transported by the system described herein.

Figure 2A:
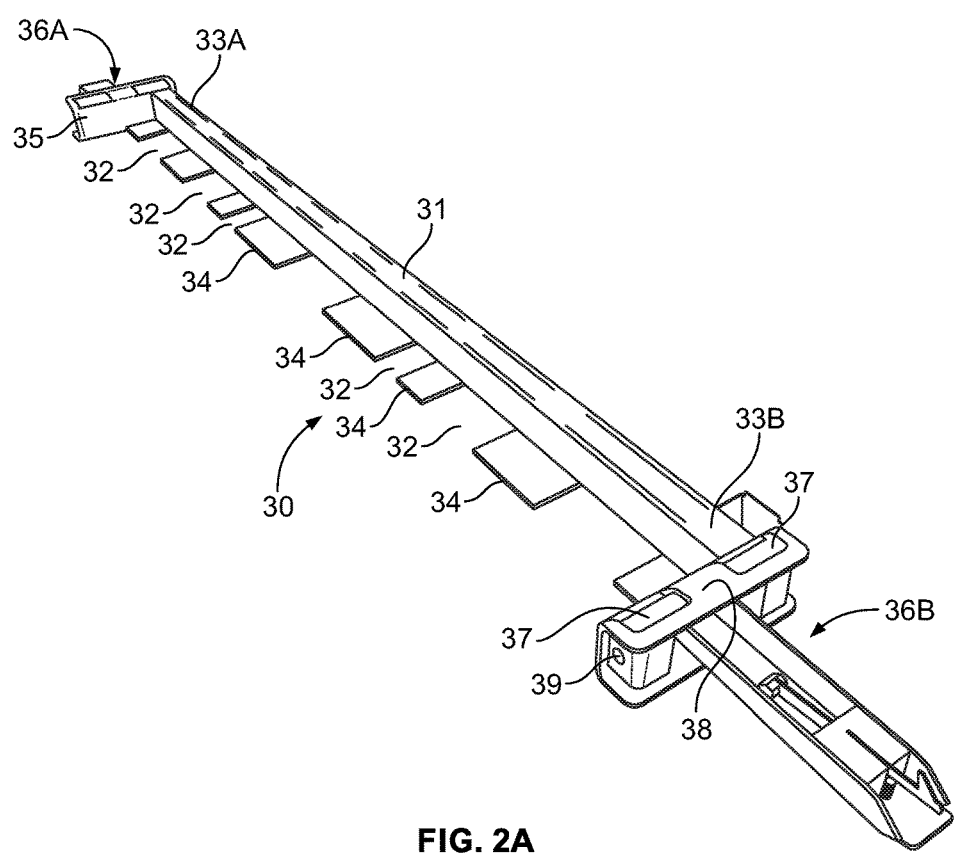
FIG. 2A is a top perspective view of an exemplary contact member in accordance with aspects of the present disclosure.

Referring now to FIG. 2A, there is shown an exemplary contact member 30 that is used to engage and lift a shelving system 10. The contact member 30 is unitary, i.e., the contact member 30 is comprised of a single unit (e.g. a single metal beam) or multiple units permanently attached (e.g. welded together), rather than two or more separate pieces that may be temporarily joined together. The contact member 30 is thus simpler and easier to use than conventional systems, which utilize complicated multi-piece components that are bolted and/or pinned together by a person lying or reaching under the shelving system 10. As shown, the contact member 30 generally comprises a body 31 and end portions 36A and 36B. The body 31 has a first end 33A that terminates at an inner face 35 of end portion 36A, and a second end 33B that terminates at an inner face (not shown) of end portion 36B. A plurality of notches 32 are defined by outwardly-extending projections 34. The contact member 30 of FIG. 2A generally has projections 34 and notches 32 positioned therebetween on only one side thereof, although it is contemplated that a contact member 30 could have projections 34 disposed on both sides thereof. In operation however, each contact member 30 is configured to be disposed on only one side of a respective one of the feet 22, and thus only the projections 34 on one side of each contact member 30 are used to engage the feet 22 of the shelving system 10. In this manner, each foot 22 has a contact member 30 disposed to only one side of the foot 22. Each individual contact member 30 thus does not sandwich the foot 22 from both sides, but rather is located on either one side of the foot 22 or the other side. The top of each end portion 36A and 36B includes one or more cavities 37 defined by a cavity housing 38. The cavities 37 are configured to receive a portion of a cross member 60 (see FIG. 5), as will be described herein. While the cavities 37 are shown to be located at the ends 36A and 36B of the contact member 30, the cavities 37 may also be located on a lifting mechanism 50 (see FIG. 3A), as will be described herein. Finally, an aperture 39 is defined in the cavity housing 39 for each cavity 37.

As is illustrated in FIG. 2A, body 31 is not centered on the end portions 36A and 36B. In this manner, end 33A of body 31 does not terminate at the center of inner face 35 of end portion 36A. Rather, end 33A of body 31 terminates at a portion of inner face 35 that is offset from the center of inner face 35. For example, the non-limiting embodiment illustrated in FIG. 2A shows that end 33A terminates at the right side of inner face 35, offset from the center of inner face 35. Similarly, end 33B of body 31 terminates at a portion of the inner face (not shown) of end portion 36B that is offset from the center of the inner face of end portion 36B. Thus, body 31 is offset from the center of end portions 36A and 36B. Generally, the direction of the offset from the center of inner face 35 of end portion 36A (and from the center of the inner face of end portion 36B) is opposite the direction that the projections 34 extend in from the body 31. For example, from the perspective of FIG. 2A, body 31 is offset to the right of inner face 35, while projections 34 extend outwardly to the left of body 31. The projections 34 are thus generally aligned with the center of inner face 35 of end portion 36A and the center of the inner face of end portion 36B. In this manner, the lifting mechanisms that will attach to the end portions 36A and 36B during operation of the system will be aligned with the projections 34 and the foot 22 of the shelving system 10. This arrangement with the lifting mechanisms, end portions 36A and 36B, projections 34, and the foot 22 of the shelving system all disposed in a generally straight line relative to each other, stabilizes the shelving system 10 and reduces the chances that the foot 22 will slip off of the projections 34 during lifting.

Figure 2B:
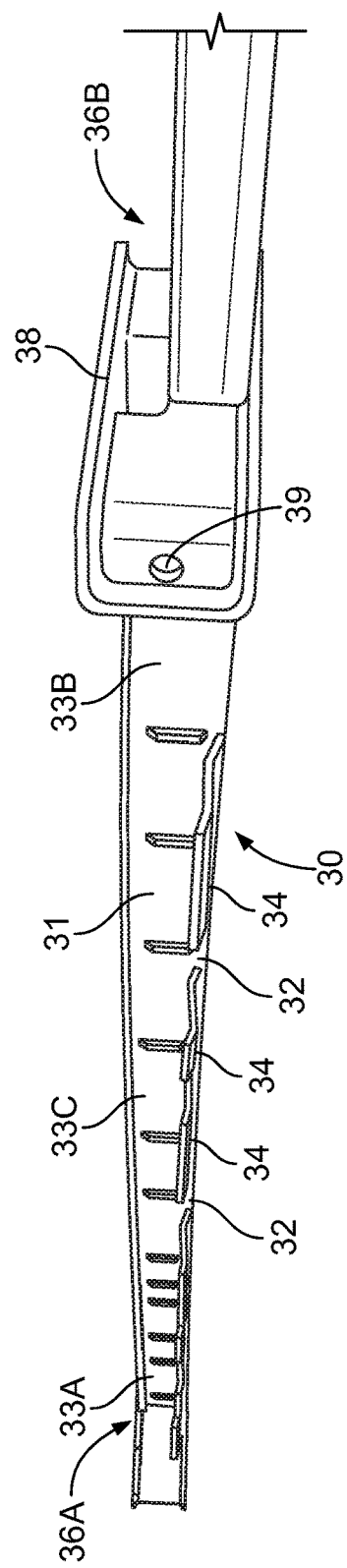
FIG. 2B is a side perspective view of the contact member of FIG. 2A.

Referring now to FIG. 2B, a side perspective view of the contact member 30 is illustrated. As is shown, the contact member 30 includes a slight curve or camber such that the contact member 30 has an upside-down U shape. This curve or camber causes the end portions 36A and 36B of body 31 to be naturally disposed at a lower height relative to a center 33C of body 31. This curve or camber is to counteract the downward flex that the body 31 will undergo when contact member 30 is used to lift the shelving system 10. Typically, the weight of the shelving system 10 on the contact member 30 during lifting will cause the center 33C of body 31 to flex downwardly such that the center 33C of body 31 will be disposed lower than its natural position (i.e. the position of center 33C of body 31 when the contact member 30 is not lifting the shelving system). By providing a contact member 30 that has a curve or camber before being used to lift the shelving system 10, this downward flexing of the center 33C of body 31 will cause the center 33C to be disposed generally level with end portions 36A and 36B during operation, such that the body 31 will be in a generally straight configuration while the shelving system 10 is being lifted. A contact member 30 without this curve or camber would result in the body 31 being in a curved configuration while the shelving system 10 was being lifted, such that the contact member 30 would have a U shape, which would weaken the contact member 30 and reduce the amount of weight that can be lifted. Having the body 31 of the contact member 31 be in a straight configuration during the lifting operation strengthens the contact member 30, thereby making it possible for the contact member 30 to be used to lift a greater amount of weight.

Figure 2C:
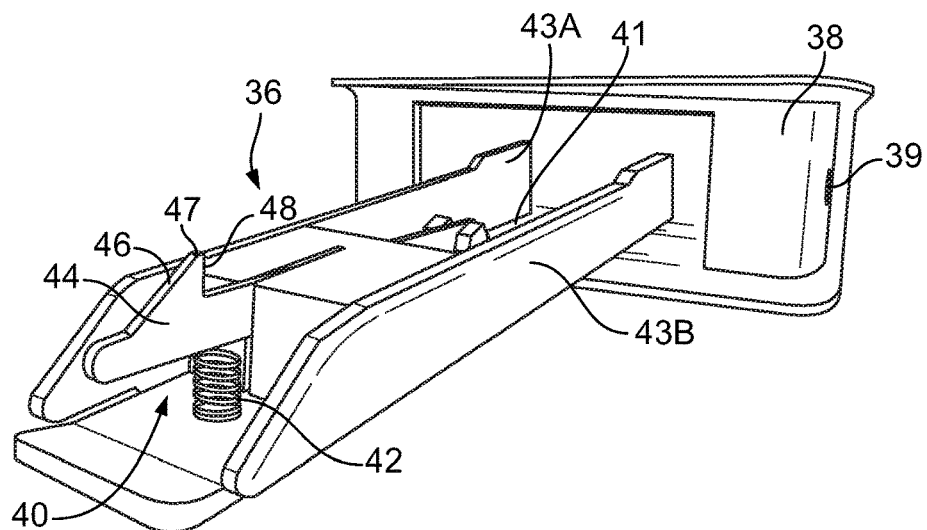
FIG. 2C is a side perspective view of an end portion of the contact member of FIGS. 2A and 2B.

Illustrated in FIG. 2C is a close-up view of an end portion 36 of the contact member 30 of FIGS. 2A and 2B extending from cavity housing 38. The end portion 36 as shown has a substantially rectangular cross section. However, other cross sectional shapes may be similarly suitable. The end portion 36 generally includes a floor piece 41 and two generally parallel sidewalls 43A and 43B. End portion 36 may include a variety of reinforcement components to increase the strength thereof. For example, end portion 36 may include a slanted component (not shown) disposed between sidewalls 43A and 43B that is secured to floor piece 41, sidewall 43A, and sidewall 43B. End portion 36 also includes an exemplary locking mechanism 40 that is used to secure the coupling between the contact member 30 and a lifting mechanism 50 (see FIG. 3A). As shown, the locking mechanism 40 includes a spring 42 and a locking member 44 rotationally coupled to floor piece 41. The spring 42 upwardly biases the locking member 44. The locking member 44 includes an inclined face 46 with a top point 47, and a vertical face 48. Other types of locking mechanisms 40 may also be employed to secure the coupling between the contact member 30 and the lifting mechanism 50. The functionality of the locking mechanism 40 will be described in further detail below with reference to FIGS. 6A and 6B. Also shown in FIG. 2C is the aperture 39 defined in the cavity housing 38. The end portion 36 may also include one or more attachment mechanisms, such as but not limited to a U-shaped clamp, that are suitable for attaching the contact member 30 to an object that is being lifted. For example, the contact member 36 may be used to lift a pallet rack. In addition to the normal operation of the contact member 36 (i.e. lifting the pallet rack from below), the attachment mechanism can attach to the pallet-rack to further secure the system to the pallet rack.

Figure 3A:
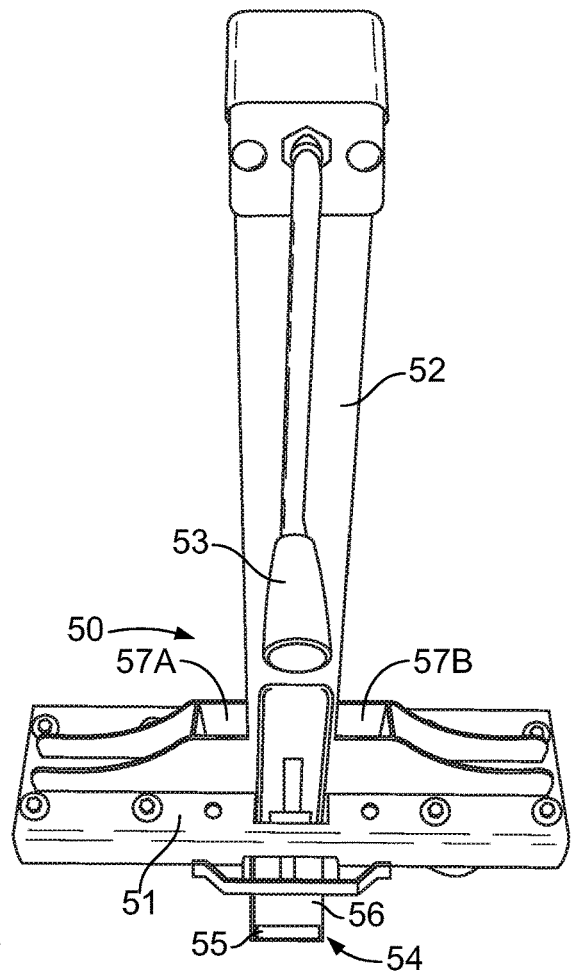
FIG. 3A is a front perspective view of an exemplary lifting mechanism in accordance with aspects of the present disclosure.

FIG. 3A shows an exemplary lifting mechanism 50 that may be utilized with the system described herein. The lifting mechanism 50 generally includes a base portion 51 and a body portion 52. The body portion 52 is shown to include a hand crank 53 that may be rotated to activate the lifting mechanism 50. The base portion 51 includes a receiving component 54 comprising a sleeve 55 defined by a sleeve housing 56. The base portion 51 may also include a pair of slots 57A and 57B that a foot of an assistance mechanism may be inserted into, as will be discussed in more detail herein. The lifting mechanism 50 shown in FIG. 3A is a jack, such as but not limited to, a screw jack, a hydraulic jack, or a pneumatic jack. However, other types of lifting devices are suitable for use with the system, such as hoists or winches. Similarly, it is recognized that other types of components are suitable to activate the lifting mechanism 50 instead of the hand crank 53, such as levers or wheels.

Figure 3B:
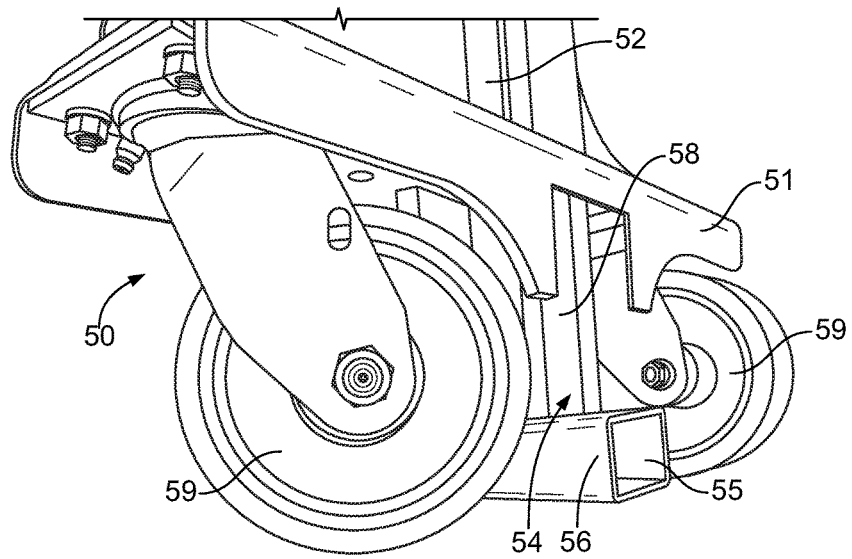
FIG. 3B is a perspective view of the base of the lifting mechanism of FIG. 3A.

FIG. 3B shows the base portion 51 of the exemplary lifting mechanism 50, including a receiving component 54 and two wheels 59. While the lifting mechanism 50 is shown with two wheels, it is possible for the lifting mechanism 50 to include any suitable number of wheels. The receiving component 54 includes a substantially hollow sleeve 55 defined by a sleeve housing 56. The sleeve housing 56 is sized such that the end portion 36 of a contact member 30 may be inserted into the sleeve 55. Similar to the end portion 36 of the contact member 30, the sleeve housing 56 is shown to define a sleeve 55 with a substantially rectangular cross section. However, other cross sectional shapes are also suitable. In some embodiments, the shape of the cross sections of the sleeve 55 and the end portion 36 will correspond, so as to allow the end portion 36 to be inserted into the sleeve 55. The receiving component 54 has an integral vertical portion 58 that extends from the sleeve housing 56 up into the interior of the body portion 52 of the lifting mechanism 50. When the hand crank 53 is rotated to activate the lifting mechanism 50, the integral vertical portion 58 is raised or lowered within the body portion 52, thus raising or lowering the end portion 36 of the contact member 30 that is inserted into the sleeve 55.

In an alternative embodiment, the contact member 30 may include a sleeve 55 defined by a sleeve housing 56. In this embodiment, the lifting mechanism 50 includes an end portion that is insertable into the sleeve 55 located on the contact member 30. Once the end portion of the lifting mechanism 50 is inserted into the sleeve 55, the hand crank 53 may be rotated to activate the lifting mechanism 50 to raise the contact member 30 off of the ground.

Figure 4:
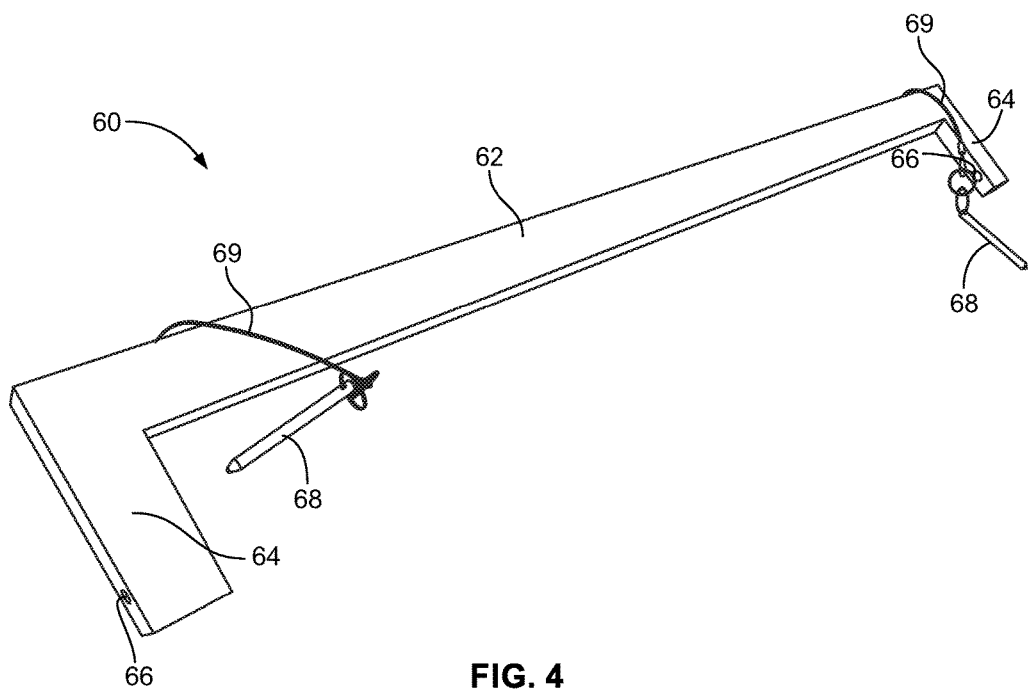
FIG. 4 is a side perspective view of an exemplary cross member in accordance with aspects of the present disclosure.

Shown in FIG. 4 is an exemplary cross member 60. The cross member 60 is comprised of a body portion 62 and two angled end portions 64. An aperture 66 is defined through each angled end portion 64. The angled end portions 64 are insertable into the cavities 37 located at each end portion 36A, 36B of a contact member 30. Alternatively, the angled end portions 64 may be insertable into cavities 37 located on each lifting member 50. As shown, the cross member 60 also includes two pins 68, which may be attached to the cross member 60 with, for example, a flexible cable 69. While the angled end portions 64 are shown in FIG. 4 to be positioned at an approximately 90 degree angle relative to the body portion 62, other angles may also suitable. As can be seen, the angled end portions 64 are integrally formed with the body portion 62 of the cross member 60. In an alternative embodiment, the angled end portions 64 may be formed of separate pieces that may be coupled with the body portion 62 of the cross member 60.

Figure 5:
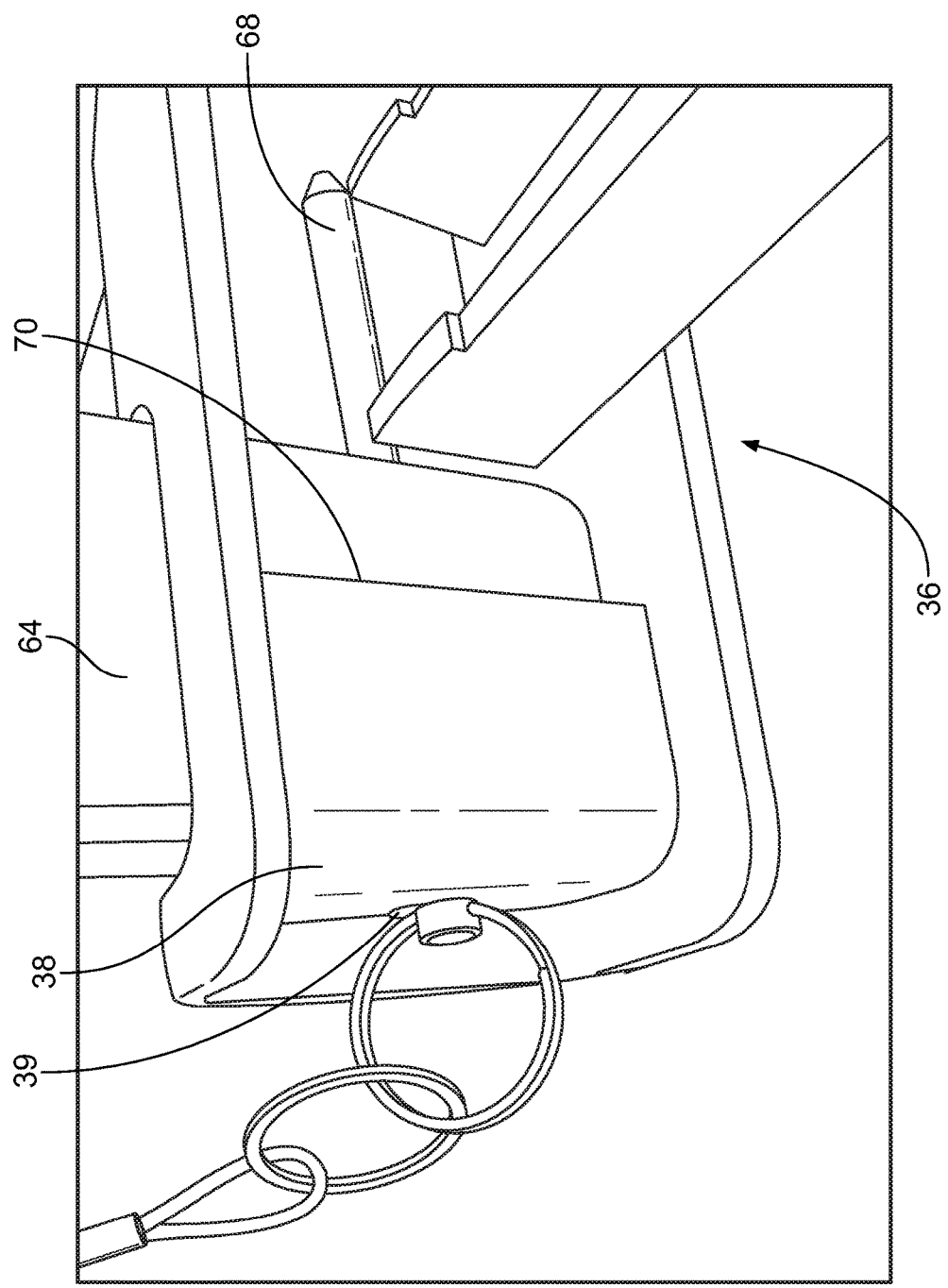
FIG. 5 is a side perspective view of the cross member of FIG. 4 being coupled with an exemplary contact member in accordance with aspects of the present disclosure.

The cross member 60 is coupled with the contact member 30 by inserting an angled end portion 64 into a cavity 37 defined at the end portion 36 of a contact member 30, as shown in FIG. 5. In an alternative embodiment, the angled end portions 64 are inserted into a cavity 37 defined on each lifting mechanism 50. The cavity housing 38 partially surrounds the angled end portion 64 when the angled end portion 64 is inserted into the cavity 37. When the angled end portion 64 is inserted into the cavity 37, the aperture 39 defined in the cavity housing 38 is aligned with the aperture 66 defined in the angled end portion 64. This allows the pin 68 to be inserted through the apertures 39 and 66. When fully inserted, the pin 68 extends through the cavity housing 38 and through the angled end portion 64 of the cross member 60, emerging from the angled end portion 64 opposite the aperture 39, as shown. The angled end portion 64 is thus locked into the cavity 37, and the cross member 60 is prevented from inadvertently decoupling with the contact member 30. Because the entirety of the angled end portion 64 is inserted and locked into the cavity 37 (rather than merely a projection or a tab extending from the unitary cross member 60), the coupling with the cross member 60 is strong and secure, thereby adding stability to the system. The locked-in cross members 60 also prevent the contact members 30 from twisting along a longitudinal axis A as shown in FIG. 7. This feature is discussed in more detail further on in reference to FIG. 7. To remove the angled end portion 64 of the cross member 60 from the contact member 30, a user simply pulls the pin 68 out of aperture 39 and aperture 66, and the angled end portion 64 of the cross member 60 may be lifted out of the cavity 37.

While FIG. 5 shows that the cavity housing 38 terminates at a vertical edge 70 and thus only partially surrounds the inserted angled end portion 64, other embodiments of the system may include a cavity housing 38 that completely surrounds the angled end portion 64 when inserted into the cavity 37. Furthermore, while the figures show that the cavity 37 and cavity housing 38 are disposed on the end portion 36 of the contact member 30, it is also possible for the cavity 37 and cavity housing 38 to be disposed on the lifting mechanism 50. In this configuration, the cross members 60 are coupled with the lifting members 50 instead of the contact members 30. Again here, the coupling between the angled end portions 36 and the lifting mechanisms 50 serve to strengthen and stabilize the system, and prevent the contact members 30 from twisting along the longitudinal axis A as shown in FIG. 7. Furthermore, while FIG. 7 shows that pin 68, when inserted through the cavity housing 38 and cross member 60 terminates at an end of a body portion of the contact member 30, the body portion as shown in FIG. 7 may actually extend further past the pin 68. In that case, the body portion of the contact member 30 may have an additional aperture to allow the pin 68 to be inserted through the body portion, thus further securing the cross member 60 to the contact member 30.

Figure 6A:
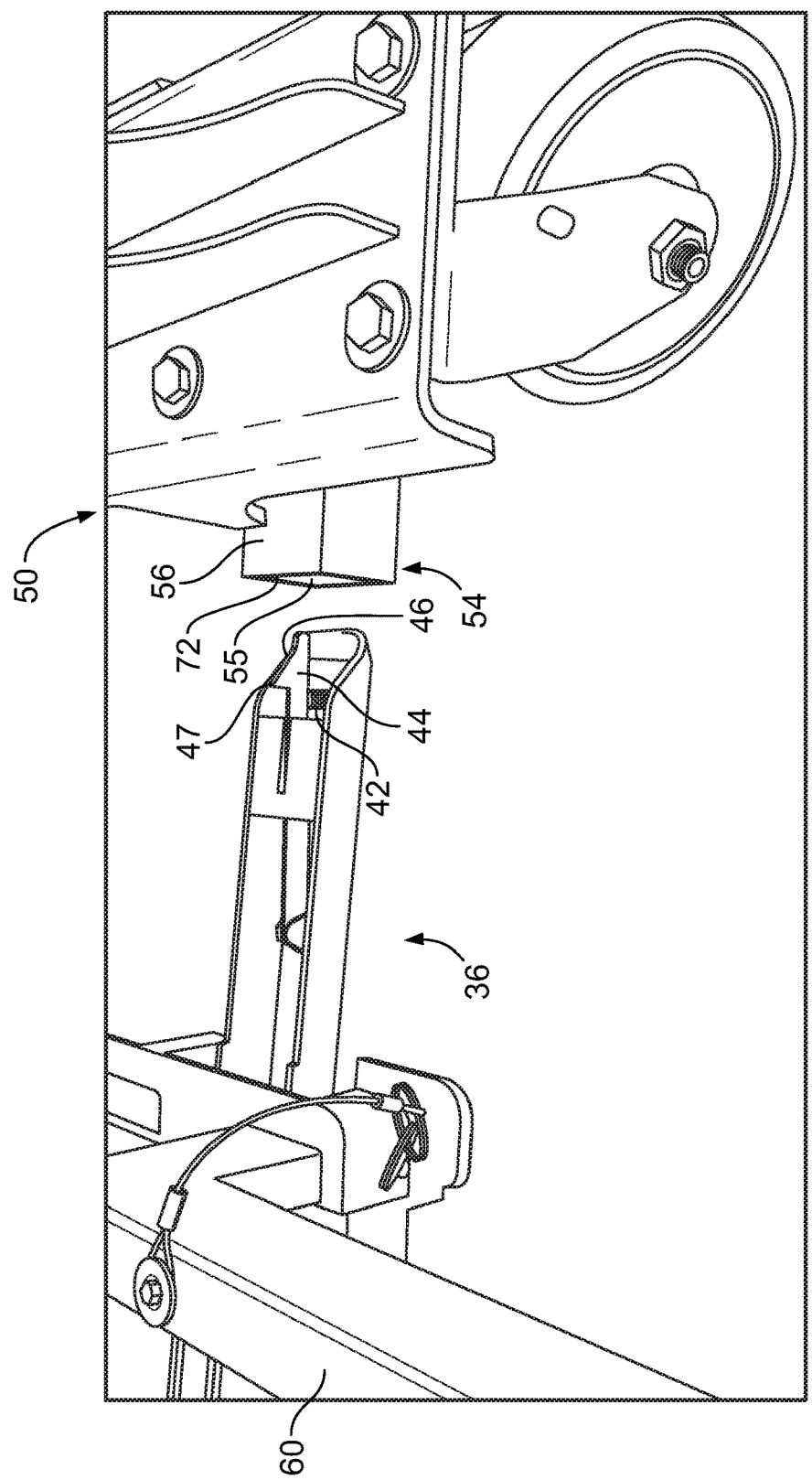
FIG. 6A shows the contact member of FIGS. 2A-2C being inserted into a receiving component of the lifting mechanism of FIGS. 3A and 3B.
Figure 6B:
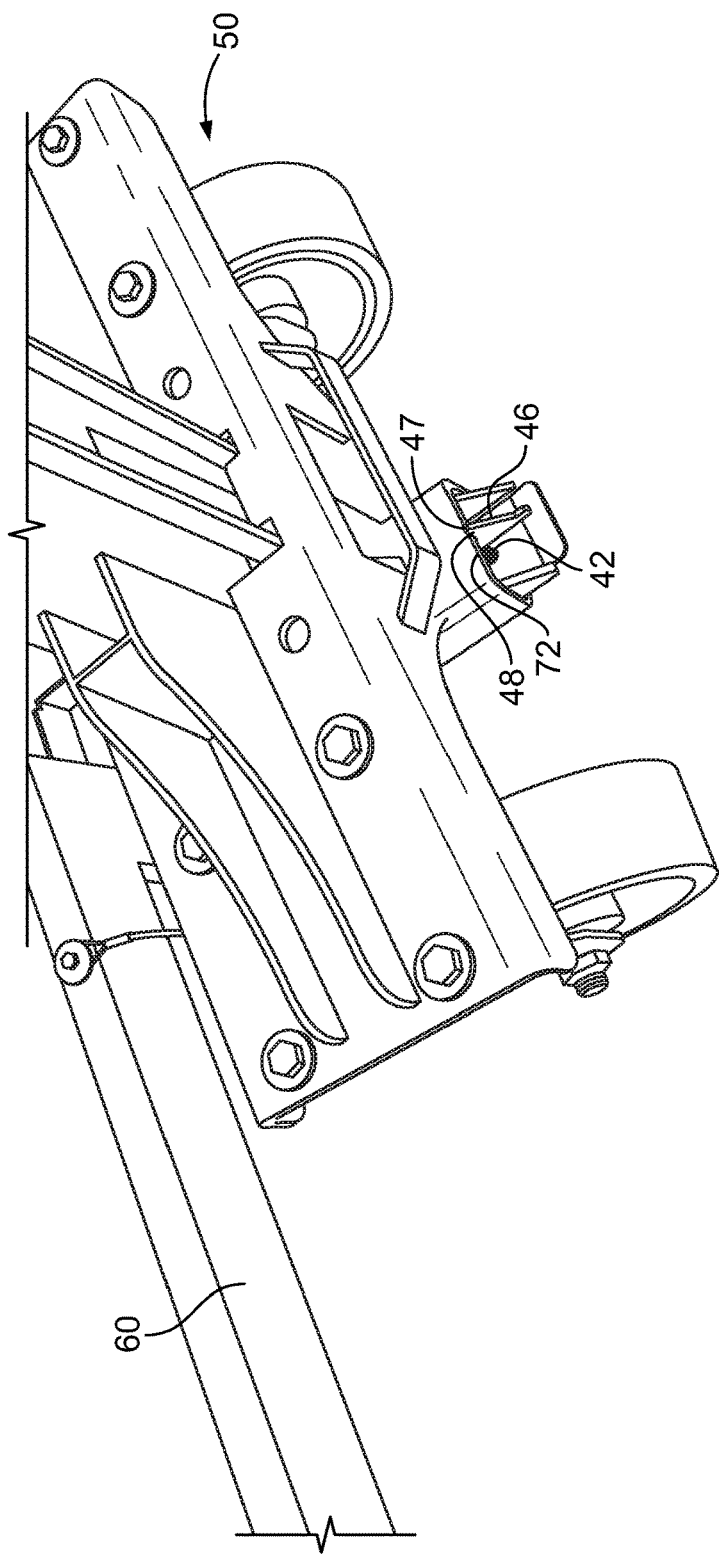
FIG. 6B shows an exemplary locking mechanism of the exemplary contact member of FIGS. 2A-2C when the contact member is coupled with the lifting mechanism of FIGS. 3A and 3B.

FIGS. 6A and 6B show the process for coupling a contact member 30 with a lifting mechanism 50. As shown in FIG. 6A, the end portion 36 of the contact member 30 and the receiving component 54 of the lifting mechanism 50 are moved towards each other. As the end portion 36 is inserted into sleeve 55 of the receiving component 54, an upper edge 72 of the sleeve housing 56 will contact the inclined face 46 of the locking member 44. As the contact member 30 continues to be inserted into the sleeve 55, the contact between the inclined face 46 and the upper edge 72 of the sleeve housing 56 forces the locking member 44 downwards and compresses the spring 42. When the locking mechanism 40 is fully disposed within the sleeve 55, the spring 42 pushes the locking member 44 upwards against the interior of the upper wall of the receiving component 54. Other types of suitable locking mechanisms are also contemplated. For example, the end of contact member 30 may have an aperture define from one side through the contact member 30 to the other side. When the end of the contact member 30 is inserted into the sleeve 55 of the lifting mechanism and protrudes from the other side of the sleeve 55, a pin may be inserted into the aperture to thus lock the contact member 30 in place. Other suitable mechanisms for securing the coupling between the contact member 30 and the lifting mechanism 50 may also be used.

In FIG. 6B, the contact member 30 has been fully coupled with the lifting mechanism 50. As shown, the end portion 36 of the contact member 30 is inserted through the sleeve 55 such that the locking member 44 extends outwardly on the opposite side of the lifting mechanism 50. Because of the upward bias of the spring 42, once the top point 47 of the inclined face 46 extends past the upper edge 72 of the sleeve housing 56, the locking member 44 is forced upwards. The top point 47 of the locking member 44 is thus elevated above the upper edge 72 of the sleeve housing 56. Thus, any force pulling apart the contact member 30 and the lifting mechanism 50 will result in the upper edge 72 of the sleeve housing 56 contacting the vertical face 48 of the locking member 44. The contact between the sleeve housing 56 and the locking member 44 prevents the contact member 30 from sliding out of the sleeve 55 and thus inadvertently decoupling with the lifting mechanism 50, for example, while the contact member 30 is supporting the shelving system 10. To decouple the contact member 30 and the lifting mechanism 50, the locking member 44 must be pressed downwards until the top point 47 is lower than the upper edge 72 of the sleeve housing 56. The contact member 30 may then be removed from the sleeve 55, thus decoupling the contact member 30 and the lifting mechanism 50.

While the locking mechanism 40 is shown as being located on the contact member 30 and the sleeve 55 is shown as being located on the lifting mechanism 50, their respective locations may be reversed. For example, the end portion 36 of the contact member 30 may include a sleeve 55 defined by a sleeve housing 56. Further, the base portion 51 of the lifting mechanism 50 may include the locking mechanism 40 instead of the receiving component 54.

In FIG. 7 is shown the placement of a contact member 30 underneath a shelving system 10 in preparation for moving the shelving system 10. The contact member 30 may be inserted from a first side of the shelving system 10 and slid or otherwise moved toward a second side of the shelving system 10. As described above, the contact member 30 has a number of projections 34 that are spaced to fit between the extensions 26 of the feet 22. In FIG. 7 it is illustrated that two projections 34 are spaced to be disposed between two extensions 26. However, it is contemplated that the two projections 34 could be joined together as a single projection 34, or that the contact member 30 may be configured such that three or more projections 34 are disposed between each set of two extensions 26. The extensions 26 correspondingly fit into the notches 32 formed between the projections 34 of the contact member 30. As shown, a single contact member 30 is configured to be disposed on only one side of each foot 22. When the contact member 30 is lifted by the lifting mechanism 50, the projections 34 engage the upper portion 24 of the foot 22 and lift the shelving system 10 up off of the floor. While there may be projections 34 on either side of the contact member 30, only the projections 34 on a single side of the contact member 30 actually engage the feet 22. When the contact member 30 is in place, a first end of the contact member 30 will extend beyond the first end of the shelving system 10, and a second end of the contact member 30 will extend beyond an opposing second end of the shelving system 10. Both ends of the contact member 30 include the cavity housing 38 defining one or more cavities 37 and the locking mechanism 40, as described above.

As noted previously, there is a torque or twisting force that is imparted to the contact members 30 while they are being raised by the lifting mechanisms 50. This twisting force is due to the uneven load placed on the contact members 30 while they engage the feet 22 of the shelving system 10. As can be seen in FIG. 7, a single foot 22 is engaged by a single contact member 30 disposed on a single side of the foot 22. The resulting uneven weight distribution on the contact member 30 and the projections 34 causes greater amount of downward force to be applied to one side of the contact member 30 as compared to the other side. The contact members thus have a tendency to rotate or twist about a longitudinal axis running along the length of the contact member 30 from one end portion 36A to the other end portion 36B, as denoted by arrow A.

Due to the uneven load on the contact members 30 and the heavy weight of the shelving system 10 and the merchandise stored thereon, any such rotation or twisting of the contact members 30 greatly increases the risk of the feet 22 disengaging from (i.e. sliding off of) the contact members 30. The plurality of cross members 60 counteracts the twisting force. The insertion of the angled end portions 64 into the cavities 37 on the contact members 30 eliminates much of the rotation or twisting of the contact members 30. The insertion of the pin 68 through the apertures 39 and 66 eliminates much of the remaining movement rotation or twisting. Thus, the presence of the cross members 60 assists in eliminating the risk of the shelving system 10 disengaging from the contact members 30, and allows the contact members 30 to exist as simple unitary components, rather than the complex multi-piece components attached around or bolted to the feet 22 of the shelving system 10.

The operation of the system is now described. A plurality of contact members 30 are slid or otherwise placed underneath the shelving system 10. One end portion 36 of each of the contact members 30 extends beyond one side of the shelving system 10, while the opposite end portions 36 extends beyond the opposite side of the shelving system 10. The contact members 30 are placed so that projections 34 on one side of each of the contact members 30 are located directly underneath feet 22 of the shelving system 10. The contact members 30 are then coupled with either a plurality of lifting mechanisms 50 or a plurality of cross members 60. To couple with the lifting mechanisms 50, a lifting mechanism 50 is moved towards each end portion 36 of each contact member 30 so that the end portion 36 is inserted into the sleeve 55 of the lifting mechanism 50. The end portion 36 is slid through the sleeve 55 until the locking mechanism 40 secures locks the contact member 30 to the lifting mechanism 50. In an alternative embodiment, an end portion of a lifting mechanism 50 is inserted into a sleeve 55 located on the contact member 30. To couple with the cross members 60, the angled end portions 64 of a cross member 60 are inserted into the cavities 37 of two adjacent contact members 30. In an alternative embodiment, the angled end portions 64 of a cross member 60 are inserted into the cavities 37 of two adjacent lifting mechanisms 50. The cross members 60 are secured by inserting a pin 68 through an aperture 39 in the cavity housing 38 of the contact member 30, and also through an aperture 66 in the cross member 60.

Once all of the components have been coupled together, one or more users may activate the lifting mechanisms 50 by rotating a hand crank 53 on each lifting mechanism 50. This lifts up the contact members 30 so that the projections 34 located underneath the shelving system 10 engage the feet 22. As the contact members 30 continue to be lifted by the lifting mechanisms 50, the projections 34 lift the shelving system 10 off of the ground. Once the shelving system 10 has been lifted off of the ground and is entirely supported by the contact members 30, the shelving system 10 may be moved to a desired location. Once the shelving system 10 is moved to the desired location, the process may be repeated in reverse to lower the shelving system 10 and remove the contact members 30.

FIG. 8 illustrates an embodiment of the system fully assembled and ready to lift and transport the shelving system 10. As can be seen, a plurality of contact members are located underneath the base of the shelving system 10. Each contact member spans the entire depth D of the shelving system 10, and each end portion of the contact members extends beyond the ends of the shelving system 10. Each contact member is generally parallel with all of the other contact members. As is shown, each end portion of each contact member is coupled with a single respective lifting mechanism 50. The coupling between each end portion of each contact member and the respective lifting mechanism 50 is secured using a respective locking mechanism. Also shown is a plurality of cross members coupled with the plurality of contact members. As previously discussed, the cross members may alternatively be coupled with the lifting mechanisms. Each of the plurality of cross members is generally perpendicular to each of the plurality of contact members. Each cross member is coupled with both a first contact member (or the respective lifting mechanism 50 coupled therewith) and a second contact member (or the respective lifting mechanism 50 coupled therewith). The two contact members that a single cross member is coupled with are immediately adjacent to each other. In this manner, each contact member is connected to all immediately adjacent contact members by a single respective cross member. Further, an individual contact member can have one or two cross members coupled therewith.

With specific reference to FIG. 8, an embodiment of the system includes first and second outer contact members 130A and 130B, and an inner contact member 130C. A first cross member 160A is coupled with both the first outer contact member 130A and the inner contact member 130C. Similarly, a second cross member 160B is coupled with both the second outer contact member 130B and the inner contact member 130C. Thus, the first outer contact member 130A and the second outer contact member 130B are each coupled with single distinct cross members 160A and 160B. Because the inner contact member 130C is immediately adjacent to two different contact members 130A and 130B, the inner contact member 130C is coupled with two different cross members 130A and 130B. More specifically, an angled end portion of the first cross member 160A is inserted into a first cavity defined by the cavity housing at the end of the inner contact member 130C, while an angled end portion of the second cross member 160B is inserted into a second cavity defined by the cavity housing at the end of the inner contact member 130C. Because both of the outer contact members 130A and 130B are immediately adjacent to only one other contact member, the first outer contact member 130A is coupled only with the first cross member 160A, and the second outer contact member 130B is coupled only with the second cross member 160B. Due to this, only one cavity on each end of the outer contact members 130A and 130B has a cross member inserted therein, while the other (outwardly facing) cavity remains empty.

Once all of the components are in place and have been coupled, the shelving system 10 can be raised. The lifting mechanisms 50 are activated by, e.g., rotating hand cranks 53 located on the lifting mechanisms 50. As the hand crank 53 of a lifting mechanism 50 is rotated, the integral vertical portion 58 of the receiving component 54 is raised into the body portion 52 of the lifting mechanism 50 (see FIG. 3B). Because the end portion 36 of the contact member 30 is coupled with the lifting mechanism 50, the contact member 30 is raised as well. As the contact member 30 is raised, the projections 34 make contact with the extensions 26 of the feet 22, thus raising the shelving system 10 into the air. This process is repeated for every lifting mechanism 50 until all feet 22 of the shelving system 10 are lifted into the air. At this point, the shelving system 10 may be transported to a desired location.

Figure 9A:
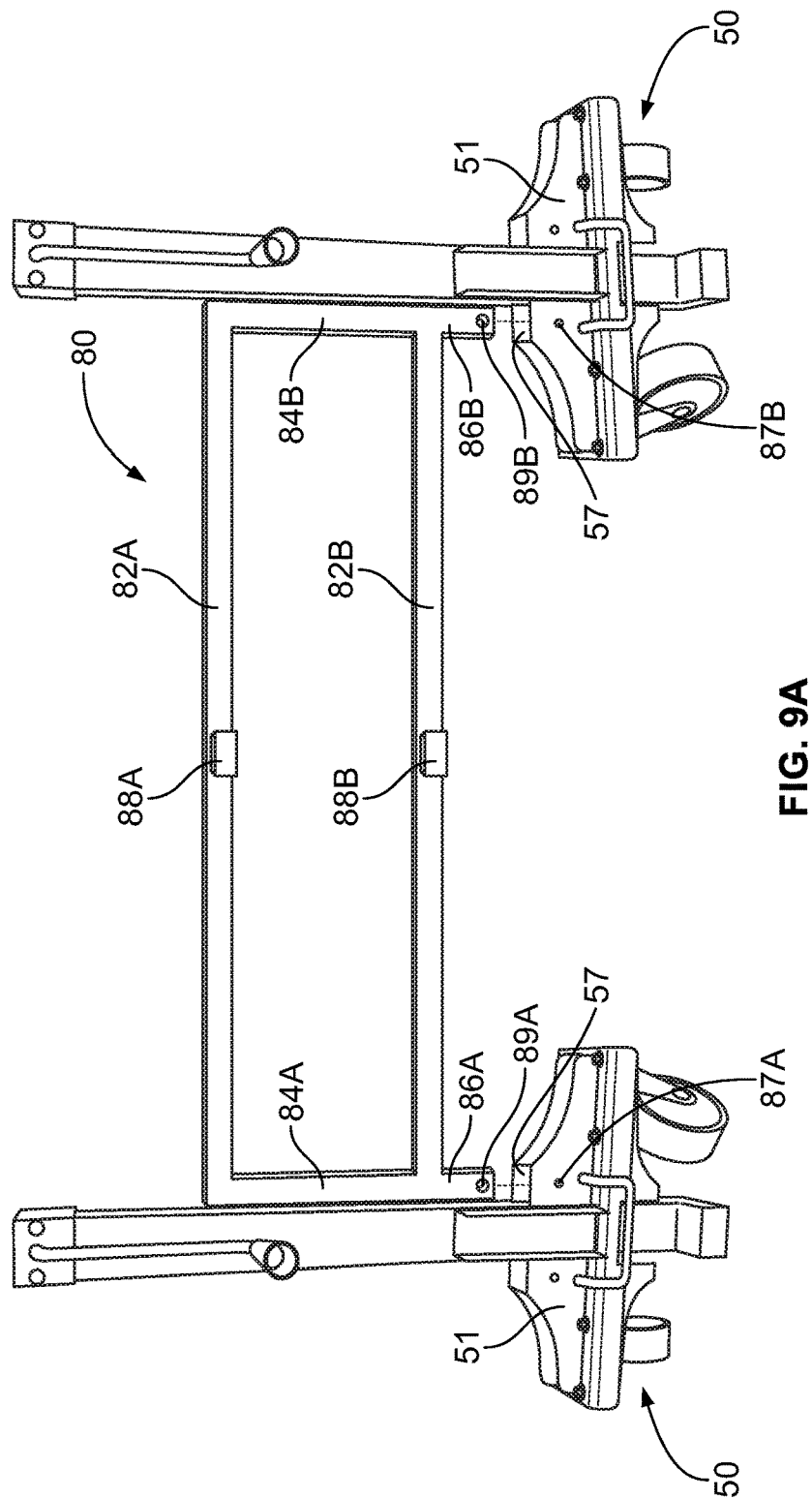
FIG. 9A shows an exemplary assistance mechanism in accordance with aspects of the present disclosure.

Referring now to FIG. 9A, another embodiment of the system is illustrated. As shown, an assistance mechanism 80 may be utilized with the system described herein. In the illustrated embodiment, the assistance mechanism 80 is a generally rectangular-shaped component that includes a first horizontal member 82A and a second horizontal member 82B that are generally parallel to each other. Each of the first horizontal member 82A and the second horizontal member 82B are joined at each end by a first vertical member 84A and a second vertical member 84B. The bottom portion of each vertical member 84A, 84B extends past the bottom portion of bottom horizontal member 82B to form feet 86A, 86B. The feet 86A, 86B may be inserted into the slots 57 defined in the base portions 51 of the lifting mechanisms 50. The feet 86A, 86B may be secured to the slots 57 by way of, for example, apertures 87A and 87B defined through the slots 57, apertures 89A and 89B defined through the feet 86A, 86B, and a pin positioned therethrough. Thus, the assistance mechanism 80 is configured to be coupled with at least two lifting mechanisms.

The assistance mechanism 80 may also include a pair of brackets 88A and 88B. A first bracket 88A may be disposed on the first horizontal member 82A, while a second bracket 88B may be disposed on the second horizontal member 82B. The brackets 88A, 88B are sized to be coupled with a component that helps a user or users transport the shelving system once it has been lifted, such as a push bar (shown as push bar 90 in FIG. 9B). The push bar 90 may be inserted through the brackets 88A, 88B, and may have a generally curved upper end 91. The push bar 90 provides an easy location for an individual to grasp the system without having to bend over, thus making it easier for the shelving system to be moved. Thus, the assistance mechanism 80 decreases the risk to the user and provides a smoother experience. The assistance mechanism 80 also helps to combat the twisting force that is imparted during the lifting process. The assistance mechanism 80, along with the cross member 60, secures two adjacent lifting mechanisms 50 to each other and prevents the twisting force from separating adjacent lifting mechanisms 50 or causing a single lifting mechanism 50 itself to rotate about the longitudinal axis running the length of the shelving system 10. Thus, the assistance mechanism 80 stabilizes the system during the lifting operation and provides a location for the operator(s) of the system to easily grasp while transporting the shelving system.

Figure 9B:
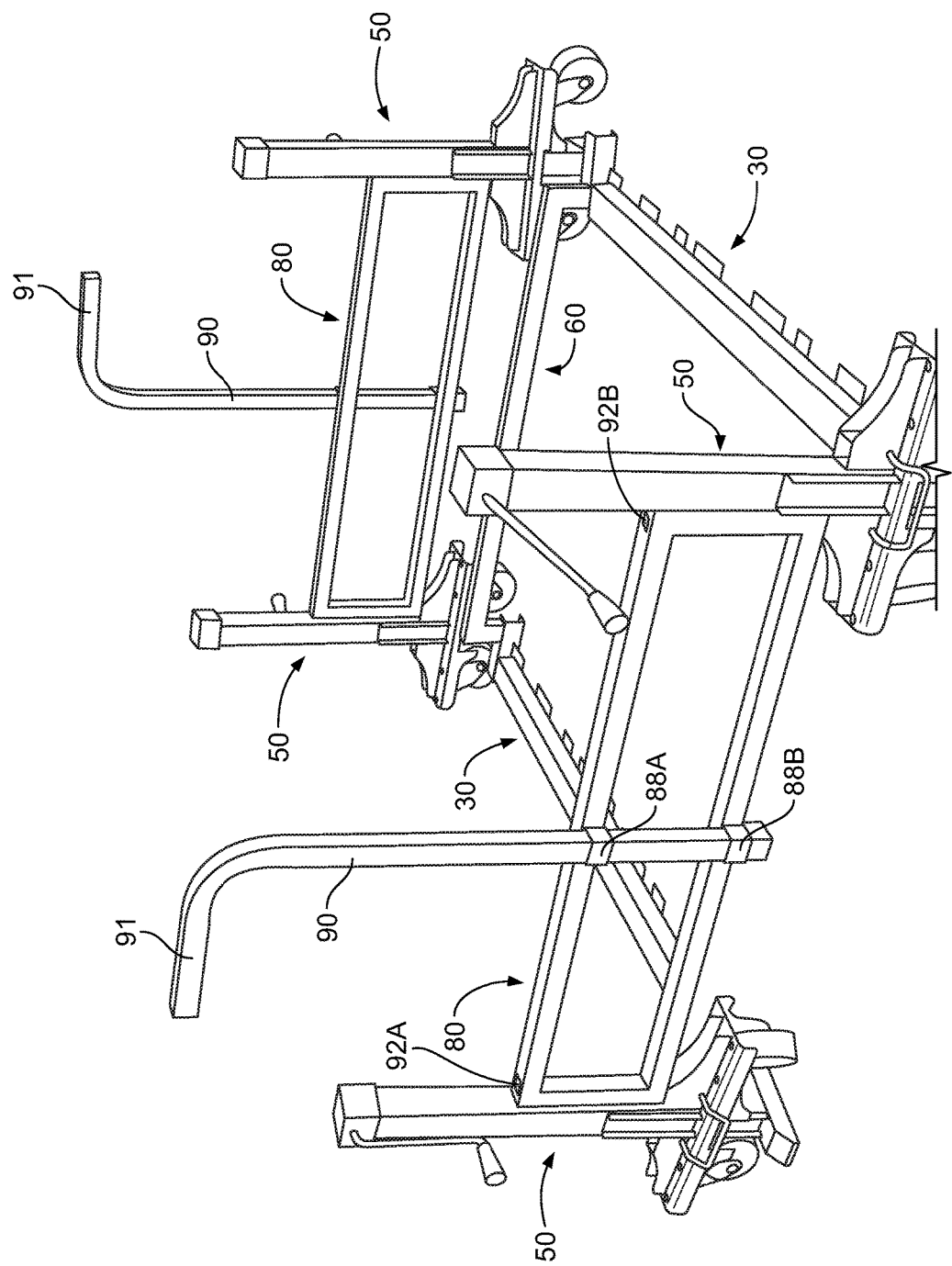
FIG. 9B shows a perspective view of the system described herein with the exemplary assistance mechanism, according to aspects of the present disclosure.

FIG. 9B illustrates a pair of assistance mechanisms 80 coupled with the system described herein. As shown, each assistance mechanism 80 is coupled with separate pairs of lifting mechanisms 50. When coupled, the assistance mechanisms 80 are substantially parallel to the cross members 60 and substantially perpendicular to the contact members 30. Accordingly, the assistance mechanisms 80 span at least a portion of the width L of the shelving system 10 (as shown in FIG. 1). The illustrated embodiment of FIG. 9B shows the push bar 90 inserted into the brackets 88A, 88B of each assistance mechanism 80. The push bar 90 includes a curved upper end 91 to allow a user to easily grasp the push bar 90. The push bar 90 can be oriented in a number of different directions with respect to the system. For example, FIG. 9B shows both push bars being oriented with the curved upper end 91 curving to the left from the perspective of someone facing the push bar 90. However, the push bar 90 may be rotated such that the curved upper end 91 curves outward away where the shelving system would be during operation, to the right, or even inward towards the shelving system.

In another embodiment, there may be apertures 92A and 92B defined in the first horizontal member of an assistance mechanism 80. As illustrated in FIG. 9B, apertures 92A and 92B are defined at each end of the first horizontal member where the first horizontal member connects with two vertical members. Each of the vertical members of an assistance mechanism 80 may thus have internal cavities where a push bar 90 may be inserted. Thus, instead of inserting a single push bar 90 through brackets 88A and 88B, two push bars 90 may be inserted through apertures 92A and 92B into each of the vertical members of the assistance mechanism 80. Each push bar 90 may thus be grasped by an operator of the system to give the operators more control while transporting the shelving system.

The system may also include an exemplary transportation mechanism. The transportation mechanism generally includes a horizontal member with a pair of downwardly pointing ends. The ends may be insertable into sleeves defined on one or more lifting mechanisms. These sleeves defined in the lifting mechanisms may be the same sleeves that are capable of receiving the feet of the assistance mechanisms, or they may be separate sleeves defined on the lifting mechanisms. Again, the downwardly-pointing ends of the transportation mechanisms may be secured with, for example, a pin-aperture system. When coupled with the lifting mechanisms, the transportation mechanisms are substantially parallel to the contact members, and substantially perpendicular to the cross members. Accordingly, the transportation mechanisms spans at least a portion of the depth D of the shelving system.

The transportation mechanism can also include a coupling component that allows the transportation mechanisms to be coupled with a mobile transportation unit such as, but not limited to, a motorized or electric cart pusher, a motorized or electric scooter, an ATV, or a bicycle. The coupling component may be a trailer hitch ball. Other types of coupling components are also contemplated. The coupling component may also include an adjustment mechanism such as an adjustor bolt that allows for a tensioning member to extend from the coupling component and contact the shelving system. This allows the mobile transportation unit to impart more force to the system as a whole to ensure that moving the shelving system is easier. Without the tensioning member, the force imparted by the mobile transportation unit would be directed more transversely onto the horizontal member. Thus, instead of helping to move the shelving system, the force would cause the horizontal member to bend transversely. Thus, the adjustment mechanism and tensioning member allow force imparted by the mobile transportation unit to be used more effectively.

The transportation mechanism allows the mobile transportation unit to transport a shelving system once the shelving system has been raised off of the ground. For example, a cart pusher, often utilized by large grocery or department stores to gather and transport carts in a parking lot, could be brought inside to couple with shelving systems that have been lifted. Instead of having multiple individuals physically transport a shelving system, a single individual could utilize a cart pusher to transport the shelving system, thus improving the store's efficiency While the embodiment of the system shown in FIG. 8 includes only three contact members, other embodiments of the system as described herein may utilize any number of contact members (and corresponding cross members and lifting mechanisms) that may be necessary to lift and transport a shelving system. For example, an embodiment of the system may utilize four contact members to lift a shelving system. When four contact members are used, there are two inner contact members and two outer contact members. According to the principles described herein, each end of each of the two inner contact members will be coupled with two cross members, while each end of each of the two outer contact members will still only be coupled with a single cross member. This coupling scheme extends to any embodiment with any number of inner contact members. All inner contact members will be connected to the two immediately adjacent contact members by coupling with two different cross members. Each of the two outer contact members will always couple with a single cross member.

Another embodiment of the system described herein only utilizes two contact members to lift a particular shelving system. In this embodiment, first and second contact members are slid or otherwise placed underneath a shelving system. A first cross member is coupled with the ends of the first and second contact members on a first side of the shelving system to connect the first and second contact members. Similarly, a second cross member is coupled with the opposite ends of the first and second contact members on a second side of the shelving system. Respective lifting mechanisms are then coupled with each end of each contact member, and the shelving system may be lifted and transported.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention. It is also contemplated that additional embodiments according to aspects of the present invention may combine any number of features from any of the embodiments described herein.

What is claimed:

1. A system for transporting a shelving system having a plurality of feet, the system comprising:
   a plurality of lifting mechanisms;
   a plurality of contact members, each contact member configured to be disposed on one side of a respective one of the plurality of feet and engage the respective one of the plurality of feet, each foot being engaged by a respective contact member disposed on a single side thereof, each contact member having two ends, each of the two ends of each contact member being configured to be coupled with a respective one of the plurality of lifting mechanisms, each contact member including at least one cavity defined therein by a housing; and
   a plurality of cross members, each cross member having a first angled end and an opposing second angled end, the first angled end of each cross member being insertable into a first one of the at least one cavity of a first one of the plurality of contact members and the second angled end of each cross member being insertable into a second one of the at least one cavity of a second adjacent one of the plurality of contact members, each cross member being configured to be coupled with either (i) the first one of the plurality of contact members and the second adjacent one of the plurality of contact members; or (ii) a first one of the plurality of lifting mechanisms and a second adjacent one of the plurality of lifting mechanisms.

2. The system of claim 1, wherein each of the plurality of contact members is unitary.

3. The system of claim 1, wherein each of the plurality of cross members is generally perpendicular to each of the plurality of contact members.

4. The system of claim 1, wherein each of the plurality of contact members includes a plurality of projections having notches formed therebetween, the notches being configured to receive the plurality of feet, the plurality of projections being configured to engage the plurality of feet.

5. The system of claim 4, wherein the plurality of cross members inhibits the plurality of projections of each of the plurality of contact members from disengaging the plurality of feet.

6. The system of claim 1, wherein each of the plurality of lifting mechanisms includes a receiving component configured to engage one of the plurality of contact members.

7. The system of claim 1, wherein each of the plurality of contact members includes a receiving component configured to engage one of the plurality of lifting mechanisms.

8. The system of claim 1, further comprising one or more locking mechanisms configured to secure the plurality of lifting mechanisms with a respective one of the plurality of contact members.

9. The system of claim 1, wherein a first aperture is defined in each angled end portion and a second aperture is defined in each housing, the first aperture and the second aperture being aligned when one of angled end portions is inserted into one of the cavities.

10. The system of claim 9, further comprising a pin insertable through the first aperture and the second aperture when the first aperture and the second aperture are aligned.

11. The system of claim 1, wherein each of the plurality of lifting mechanisms is a jack including a hand crank operable to raise or lower the jack.

12. The system of claim 1, wherein each of the plurality of lifting mechanisms includes at least one wheel.

13. The system of claim 1, wherein the plurality of contact members includes a first outer contact member, a second outer contact member, and an inner contact member positioned generally between the first and second outer contact members.

14. The system of claim 13, wherein (i) each end of the inner contact member is coupled with a first and a second one of the plurality of cross members; (ii) each end of the first outer contact member is coupled with the first one of the plurality of cross members; and (iii) each end of the second outer contact members is coupled with the second one of the plurality of cross members.

15. The system of claim 1, wherein each of the plurality of contact members extends from a first side of the shelving system to an opposing second side of the shelving system.

16. The system of claim 1, further comprising a plurality of assistance mechanism, each assistance mechanism configured to couple with an adjacent pair of the plurality of lifting mechanisms.

17. A moving system for transporting a shelving system having a plurality of feet, the system comprising:
- a first contact member and a second contact member, each contact member having a first end and a second end and being configured to be disposed on one side of one of the plurality of feet, each foot having a contact member disposed on a single side thereof;
- a plurality of lifting mechanisms, each end of both the first contact member and the second contact member being configured to be coupled with a respective one of the plurality of lifting mechanisms;
- a first cross member configured to be coupled with either (i) the first end of the first contact member and the first end of the second contact member, or (ii) a first one of the plurality of lifting mechanisms coupled with the first end of the first contact member and a second one of the plurality of lifting mechanisms coupled with the first end of the second contact member;
- a second cross member configured to be coupled with either (i) the second end of the first contact member and the second end of the second contact member, or (ii) a third one of the plurality of lifting mechanisms coupled with the second end of the first contact member and a fourth one of the plurality of lifting mechanisms coupled with the second end of the second contact member;
- a first assistance mechanism and a second assistance mechanism, each assistance mechanism having a first foot and a second foot, the first foot of the first assistance mechanism coupling with the first one of the plurality of lifting mechanisms and the second foot of the first assistance mechanism coupling with the second one of the plurality of lifting mechanisms, the first foot of the second assistance mechanism coupling with the third one of the plurality of lifting mechanisms and the second foot of the second assistance mechanism coupling with the fourth one of the plurality of lifting mechanisms.

18. A system for transporting a shelving system having a plurality of feet, the system comprising:
- a plurality of lifting mechanisms;
- a plurality of contact members including a first outer contact member, a second outer contact member, and an inner contact member positioned generally between the first outer contact member and the second outer contact member, each contact member being configured to be disposed on one side of a respective one of the plurality of feet and engage the respective one of the plurality of feet, each foot being engaged by a respective contact member disposed on a single side thereof, each contact member having two ends, each of the two ends of each contact member being configured to be coupled with a respective one of the plurality of lifting mechanisms; and
- a plurality of cross members including a first cross member and a second cross member, wherein (i) one end of the first outer contact member is coupled with the first cross member, (ii) one end of the second outer contact member is coupled with the second cross member, and (iii) one end of the inner contact member is coupled with both the first cross member and the second cross member.

* * * * *